United States Patent [19]

Gundersen

[11] Patent Number: 5,375,561
[45] Date of Patent: Dec. 27, 1994

[54] BICYCLE MOUNTED PET RESTRAINT

[76] Inventor: Jerome H. Gundersen, 5151 Santa Fe L-2, San Diego, Calif. 92101

[21] Appl. No.: 157,535

[22] Filed: Nov. 26, 1993

[51] Int. Cl.⁵ .............................................. A01K 15/00
[52] U.S. Cl. ...................................................... 119/771
[58] Field of Search .............................. 119/769, 771; 280/288.4, 292

[56] References Cited

U.S. PATENT DOCUMENTS

| | | | |
|---|---|---|---|
| 4,134,364 | 1/1979 | Boncela | 119/771 X |
| 4,854,269 | 8/1989 | Arntzen | 119/771 X |
| 5,033,409 | 7/1991 | Sabot | 119/771 X |
| 5,215,037 | 6/1993 | Allred | 119/771 |

Primary Examiner—Gene Mancene
Assistant Examiner—Thomas Price
Attorney, Agent, or Firm—Ralph S. Branscomb

[57] ABSTRACT

A restraint for a dog or other pet is mounted on a bicycle so that the dog can run along with its master while the master rides, while maintaining the dog just far enough to the rear to avoid the bicycle's pedals and prevent the dog from dashing between the wheels. A rigid bar has a two-point attachment to the rear wheel axle and chain stay, and extends rearwardly around the rear wheel, with the point of attachment for the pet leash being in longitudinal alignment with the bicycle and close to the ground, such that the left-right centering coupled with the low point of attachment minimizes the destabilizing effects on the bicycle from the animal's tugs.

10 Claims, 1 Drawing Sheet

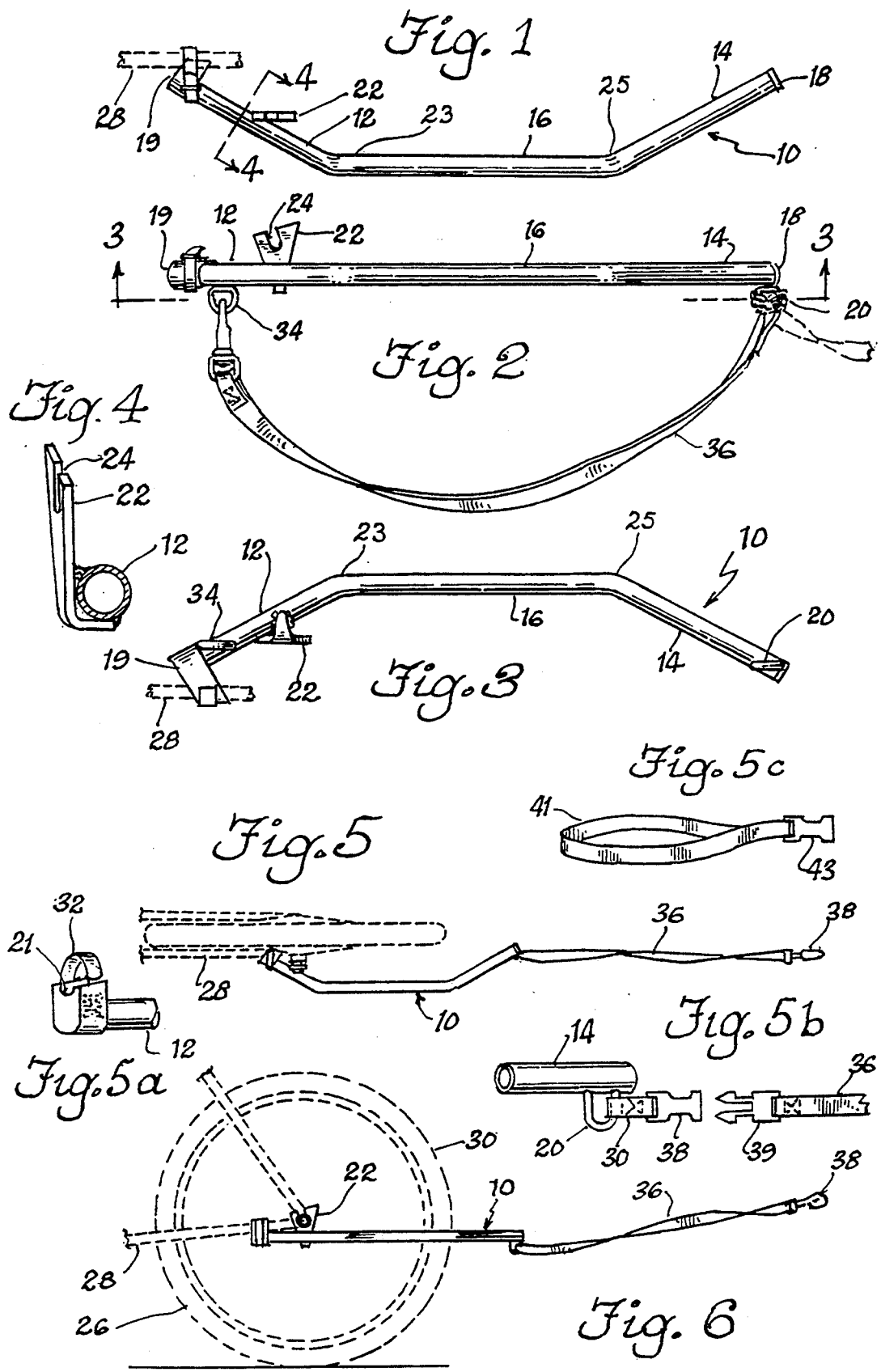

5,375,561

BICYCLE MOUNTED PET RESTRAINT

BACKGROUND OF THE INVENTION

Bicycling has become increasingly popular and the number of people switching to bicycling from running or swimming, etc., as their workout sport is on the rise. As people age, they gravitate toward bicycles as an alternative because of the low-impact aerobic workout potential.

This may be problematic for people who in the past walked the dog while jogging. Many house dogs must be walked once a day, and the owner, pressed for time, combines his own exercise with the dog's walking needs. However, trying to ride a bicycle while holding a dog on a leash is not like jogging with a dog. A dog may become excited and try to dash between the wheels after a cat or a squirrel, or may snag the leash on the pedals. Not only does the pet have a proclivity for becoming fouled up with the moving parts of the bicycle, its romping at the end of the leash has a serious destabilizing effect on a bicyclist holding the leash in one hand, or having it tied to the bicycle handlebars.

While little stubby leash attachment means have been developed for cyclists, they suffer from two basic drawbacks. First, they are mounted on or adjacent to the handlebars or another portion of the bicycle which is relatively high up, creating a long moment arm for toppling the rider. Second, the bar extends to one side of the bicycle, giving the dog the further advantage of being able to torque the rider about a vertical axis. This results in serious practical limitations imposed on the rider, as only small or low-energy dogs would be streetsafe. Trailing large dogs with these arrangements is risky for both dog and master. But then being small is hazardous to the animal, subjecting it to a higher likelihood of entanglement with the pedals or rear wheel spokes.

Several design criteria must be met to in order to create a safe, workable bicycle-mounted pet restraint. First, it must tether the animal relatively low to the ground to avoid the high moments otherwise availed the pet. Handlebar attachments are out. Secondly, while keeping the center of force low on the bicycle by low mounting, the tether should ideally be mounted along the longitudinal vertical plane of symmetry, or longitudinal centerline, of the bicycle to minimize lateral destabilization.

Another criteria is the ease of removing the restraint when not in use, as difficult-to-remove accessories tend not to be used. And of course, the usual successful marketing criteria of being light-weight, visually appealing and easy to use apply.

SUMMARY OF THE INVENTION

The invention meets the above-stated criteria, comprising a simple double-bent bar with a mounting flange which is locked onto the rear wheel by slipping it over the axle before the wheel-mounting nut is threaded into place or the quick-release is clamped. The bar extends forwardly from this attachment under the chain stay, mounting a D-ring at its forward end which acts as a guide for a Velcro ® cinch which cinches the bar to the underside of the left chain stay opposite the derailleur.

The bar curves rearwardly outwardly from the left wheel hub and then arches back in to a point just behind the wheel, substantially in alignment with the longitudinal vertical plane of symmetry of the bicycle and a few inches over the pavement. By being attached both along the plane of lateral symmetry at the wheel hub and extending very close to the ground, the bicycle remains highly stable despite the tugging of even large dogs. A tether is attached to the rear tip of the bar, and, at the other end, connects to the animal. The tether is just long enough to give the dog physical freedom to run, but not long enough to allow entanglement in the pedal cranks or permit kamikaze diving between the wheels at high speed.

BRIEF DESCRIPTION OF THE DRAWINGS

FIG. 1 is a top plan view of the restraint absent the leash and the rear fork cinch;

FIG. 2 is a side elevation view of the restraint as it would appear mounted on a bicycle, but without the bicycle;

FIG. 3 is a section taken along line 3—3 of FIG. 2;

FIG. 4 is a section taken along lines 4—4 of FIG. 1;

FIG. 5 is a top plan view of the restraint complete with tether shown as it would appear in relation to the rear wheel in use;

FIG. 5a is a detail of the front end of the restraint illustrating a molded form-fitted tip which seats the chain stay in its upper concavity;

FIG. 5b is a detail illustrating the quick-release coupling between the bar and the leash/tether;

FIG. 5c is a detail of the loop of the quick-release leash that doubles as the tether when used on a bicycle; and, FIG. 6 is a view similar to FIG. 2 as seen from the left side of the bicycle, with the bicycle being illustrated in phantom and the leash shown extended.

DETAILED DESCRIPTION OF THE PREFERRED EMBODIMENT

The main part of the invention is the elongated bar 10 preferably made of lightweight, plastic, steel or aluminum tubing, steel, plastic or any other suitable material and capped on the ends as indicated at 18 and 19. The bar defines an angled arc and rests against the underside of the left chain stay just forward of the rear wheel axle, where the contoured cap 19 seats the stay in the concave channel 21. The endcaps 18, 19 are preferably molded plastic. Forward of the attachment the bar extends out to clear the wheel and then angles back to terminate at the longitudinal centerline, where the pet is tethered at the tethering eyelet 20. The bar could be defined in a smooth arc, although the double-bent embodiment that is illustrated having a front, first bend 23 and a rear, second bend 25 which serve as demarcations between the bar's forward end portion 12, its central straight portion 16 and its trailing end portion 14 is easier to make and aesthetically more appealing.

The front end portion of the bar mounts a flange 22 which has a re-entrant slot or aperture 24, which could also be a hole, by which the flange is attached to the rear axle retained by the rear wheel mounting hardware, namely the retainer nut which screws onto the axle which extends through the axle mount apertures of the rear chain stay. The open-slotted embodiment illustrated in FIGS. 2 and 6 is designed for quick-release applications, requiring only the loosening of the axle nut or the quick-release lever, enabling the restraint to be removed and replaced as simply as removing and replacing a front wheel. If a hole is used in the flange rather than the slot, the bolt would have to be removed prior to removing the restraint and release time would suffer accordingly.

The restraint is illustrated mounted onto a phantom bicycle wheel 26 and chain stay 28. The flange engages the rear wheel axle and is retained by the nut as shown in FIG. 6, while the forward end portion 12 slips underneath the chain stay 28. Once bolted on the restraint is fairly secure, but to further strengthen the mounting a cinch strap 32, shown integral with the forward endcap 19, may be used to engage around the forward end of the bar 28 to minimize longitudinal migration of the strap. By being mounted to the underside of the frame member, the natural leveraging of the rearwardly cantilevered bar is offset.

A leash or tether 36 is attached to the eyelet 20 by any suitable means. In the illustrated embodiment, a short strap 30 is mounted on the ring 20 and terminates in a quick-release fastener 38, engageable with a corresponding termination 39 on the leash and defines a generally circular-sector area circumscribed by a radius defined by the tether length, within which the pet can run. A hand loop 41 which also has a quick-release coupling 43 may be provided to provide a smooth transition from bicycling to walking without interrupting control over the animal.

The leash 36 could be a leather or other non-elastic leash, but is preferably a bungee-cord type connector so that sudden shocks are not applied to the pet's neck when it reaches the end of its leash. A monofilament elastomeric rope is ideal. In the event the elastomeric rope is used, the quick-release coupling would likely be a barrel-type coupling similar to pneumatic hose couplings. Alternatively the leash could have a spring-loaded shock absorber contained within the body.

In a slight variation, the leash 36 could be made long enough to pass completely through the bar 10 so that the effective length of the leash is adjustable by pulling more or less of the leash forwardly of the bar and tying it off either on part of the bicycle or on a tie-off shown in FIG. 6. This feature might not be necessary since one length of leash is adequate for all purposes, but it might appeal to certain buyers with special needs. The longer leash option would also add the security of enabling the rider to pull in the pet when approaching an obstacle.

With increased interest in exercise in general, and the aging of the population to the point at which running becomes increasingly less healthy, bicycling is a natural substitute. For those who currently walk or in the past have walked pets, the need to tether the animal to the bicycle is manifest. Although designed primarily for dogs, cats, pet pigs and other animals could be tethered as well, although it is not recommended for fish. When used with dogs, even energetic dogs weighing 200 pounds, the design of the restraint is such that the stability of the bicycle is not unduly compromised and by exercising due caution a safe ride can be had. For a person who rides a lot and takes a dog or other pet along, a restraint of this type is a must, making it safer for pedestrians, the cyclist, and the dog.

It is hereby claimed:

1. A pet restraint for attachment to a bicycle having a rear wheel mount, for permitting a limited range of movement of a pet attached to said restraint while said bicycle is being ridden, said restraint comprising:
   (a) an elongated bar having a forward end portion and a trailing end portion;
   (b) said forward end portion defining attachment means to rigidly attach same to said rear wheel mount;
   (c) said bar and attachment means being configured such that when said bar is rigidly attached to said bicycle, said bar extends rearwardly such that the trailing end thereof is disposed rearwardly of the rotational axis of a wheel mounted in said rear wheel mount; and,
   (d) an at least partially flexible tether connected to said trailing end portion for attachment to a pet to constrain the pet to running adjacent the bicycle within a circular sector area circumscribed by a radius defined by the tether length.

2. Structure according to claim 1 wherein said rear wheel mount comprises a chain stay defining axle mount apertures for engaging threaded ends of an axle of a rear wheel mounted therein, and said attachment means comprises a flange with an opening therein in alignment with said axle mount apertures and rigidly engageable against said stay by nuts.

3. Structure according to claim 2 wherein said bar is substantially arcuate and is shaped such that when said flange engaged against said stay, said bar arcs laterally from the forward end portion thereof to the trailing end portion first away from said wheel to provide wheel clearance and then back toward the longitudinal vertical plane of symmetry of the bicycle such that said trailing end portion is substantially aligned with said plane to minimize lateral destabilizing forces caused by a pet connected to said tether.

4. Structure according to claim 3 wherein said stay has a substantially horizontal component and the forward end portion of said bar extends forwardly of said flange into adjacency with said horizontal component, and including a strap for engaging said forward end portion to said horizontal components such that said bar is mounted to said bicycle at two spaced points along the length thereof.

5. Structure according to claim 4 and including a ring mounted on said forward end portion to engage said strap.

6. Structure according to claim 3 wherein the rear wheel axle is retained on said chain stay by a nut or quick-release, and the opening of said flange is a re-entrant slot such that flange is released by loosening the nut or quick-release of the rear wheel axle.

7. Structure according to claim 1 and including an eyelet defined by the trailing end portion of said bar for attachment thereto by a tether, and said tether comprises a two-piece leash, with a first of said pieces engaged to said bar and the second piece coupled to said first piece with a quick-release coupling, and including a quick-release clip on the other end of said leash for rapid constraint or release of a pet.

8. Structure according to claim 7 and including a hand loop with a quick-release coupling to releasibly couple to said second leash piece.

9. Structure according to claim 8 and including a retainer ring mounted on said trailing end portion to engage a strap wrapped around said forward end portion and a horizontal portion of a rear wheel mounting fork, and said leash is of adequate length to extend to in between said ring and said eyelet.

10. Structure according to claim 9 wherein said bar has a first and a second bend defining said forward and rearward portions, respectively, and defining a central straight portion between said bends.

* * * * *